(12) United States Patent
Happel

(10) Patent No.: US 10,470,429 B2
(45) Date of Patent: Nov. 12, 2019

(54) TEAT CUP LINER

(71) Applicant: Happel WDA Besitz GbR, Friesenried (DE)

(72) Inventor: Werner Happel, Friesenried (DE)

(73) Assignee: INRAD Technologies B.V., Wijchen (NL)

(*) Notice: Subject to any disclaimer, the term of this patent is extended or adjusted under 35 U.S.C. 154(b) by 268 days.

(21) Appl. No.: 15/117,667

(22) PCT Filed: Feb. 10, 2015

(86) PCT No.: PCT/EP2015/052773
§ 371 (c)(1),
(2) Date: Aug. 9, 2016

(87) PCT Pub. No.: WO2015/118170
PCT Pub. Date: Aug. 13, 2015

(65) Prior Publication Data
US 2016/0345535 A1 Dec. 1, 2016

(30) Foreign Application Priority Data
Feb. 10, 2014 (DE) .................. 10 2014 101 613

(51) Int. Cl.
A01J 5/08 (2006.01)
(52) U.S. Cl.
CPC ........................ A01J 5/08 (2013.01)
(58) Field of Classification Search
CPC ........................ A01J 5/08; A01J 5/06
USPC ................ 119/14.47–14.49, 14.52
See application file for complete search history.

(56) References Cited

U.S. PATENT DOCUMENTS

| | | | | |
|---|---|---|---|---|
| 949,186 A * | 2/1910 | Klein | ............... | A01J 5/08 119/14.52 |
| 954,110 A * | 4/1910 | Klein et al. | ............... | A01J 5/08 119/14.52 |
| 1,000,948 A * | 8/1911 | Ridd | ............... | A01J 5/08 119/14.52 |
| 1,051,482 A * | 1/1913 | Brodie | ............... | A01J 5/04 119/14.12 |
| 1,285,079 A * | 11/1918 | Eklundh et al. | ............... | A01J 5/08 119/14.52 |
| 2,484,696 A * | 10/1949 | Dinesen | ............... | A01J 5/08 119/14.53 |

(Continued)

FOREIGN PATENT DOCUMENTS

| | | | | |
|---|---|---|---|---|
| CA | 2570327 A1 * | 1/2006 | ............... | A01J 5/08 |
| CA | 2805288 A1 * | 1/2012 | ............... | A01J 5/08 |

(Continued)

OTHER PUBLICATIONS

Office Action dated Nov. 17, 2017 in corresponding JP App. No. 2016-568129.

(Continued)

Primary Examiner — Magdalena Topolski
Assistant Examiner — Morgan T Barlow
(74) Attorney, Agent, or Firm — Boyle Fredrickson S.C.

(57) ABSTRACT

A teat cup liner is provided that includes a comparatively thick-walled rear wall and a comparatively thin-walled massage wall. These two walls together from a tube part around a teat-receiving chamber. Preferably, at least two stabilizing strips are provided on the massage wall.

14 Claims, 2 Drawing Sheets

(56) References Cited

U.S. PATENT DOCUMENTS

| | | | |
|---|---|---|---|
| 2,604,873 A * | 7/1952 | Merritt | A01J 5/08 119/14.53 |
| 2,687,112 A * | 8/1954 | Shurts | A01J 5/08 119/14.49 |
| 2,935,964 A * | 5/1960 | Pickavance | A01J 5/08 119/14.47 |
| 3,967,587 A * | 7/1976 | Noorlander | A01J 5/08 119/14.49 |
| 4,200,058 A * | 4/1980 | Happel | A01J 5/04 119/14.01 |
| 4,610,220 A * | 9/1986 | Goldberg | A01J 5/08 119/14.47 |
| 5,482,004 A | 1/1996 | Chowdhury | |
| 6,435,132 B1 | 8/2002 | Milbrath et al. | |
| 6,546,893 B1 | 4/2003 | Heppel et al. | |
| 6,776,120 B1 * | 8/2004 | Chowdhury | A01J 5/08 119/14.46 |
| 6,796,272 B1 * | 9/2004 | Chowdhury | A01J 5/08 119/14.46 |
| 8,356,577 B2 * | 1/2013 | Van Den Berg | A01J 5/007 119/14.01 |
| 8,375,894 B2 | 2/2013 | Chowdhury | |
| 8,567,346 B1 | 10/2013 | Alveby | |
| 2008/0035064 A1 * | 2/2008 | Petterson | A01J 5/08 119/14.47 |
| 2008/0072826 A1 | 3/2008 | Happel | |
| 2009/0084319 A1 * | 4/2009 | Sellner | A01J 5/08 119/14.47 |
| 2010/0089326 A1 * | 4/2010 | Petterson | A01J 5/08 119/14.49 |
| 2014/0123903 A1 * | 5/2014 | Priest | A01J 5/08 119/14.47 |
| 2015/0090183 A1 * | 4/2015 | Hedlund | A01J 5/08 119/14.47 |
| 2015/0114298 A1 * | 4/2015 | Alveby | A01J 5/08 119/14.02 |
| 2016/0066531 A1 * | 3/2016 | La Torre | A01J 5/16 119/14.43 |
| 2016/0128299 A1 * | 5/2016 | Hedlund | A01J 5/044 119/14.47 |
| 2016/0345535 A1 * | 12/2016 | Happel | A01J 5/08 |

FOREIGN PATENT DOCUMENTS

| | | | | |
|---|---|---|---|---|
| CA | 2872749 A1 * | 11/2013 | | A01J 5/08 |
| CH | 477812 | 9/1969 | | |
| CH | 562553 | 6/1975 | | |
| DE | 2551931 A1 * | 6/1977 | | A01J 5/08 |
| DE | 19912615 | 9/2000 | | |
| DE | 19912615 A1 * | 9/2000 | | A01J 5/08 |
| DE | 10152662 | 4/2003 | | |
| DE | 102006026271 | 11/2007 | | |
| DE | 102006040079 | 3/2008 | | |
| DE | 102007053230 | 5/2009 | | |
| DE | 102011001788 A1 * | 10/2012 | | A01J 5/08 |
| EP | 1219166 | 7/2002 | | |
| EP | 1334656 | 8/2003 | | |
| EP | 1119235 | 2/2004 | | |
| FR | 607734 | 7/1926 | | |
| GB | 168234 A * | 9/1921 | | A01J 5/08 |
| GB | 284236 A * | 3/1929 | | A01J 5/08 |
| GB | 331297 A * | 7/1930 | | A01J 5/08 |

OTHER PUBLICATIONS

ISR & Written Opinion of corresponding PCT application, PCT/EP2015/052773, dated May 15, 2015.

Search Report of corresponding DE application, DE 10 2014 101 613.0, dated Nov. 11, 2014.

* cited by examiner

TEAT CUP LINER

BACKGROUND OF THE INVENTION

Field of the Invention

The invention relates to a teat cup liner including a teat cup liner head and a tube part delimiting an interior space into which a vacuum connection adapted to be closed against the vacuum opens.

Description of Related Art

For machine milking, a gentle teat treatment is of salient importance. Such gentle teat treatment is ensured, for example, in milking systems in which vacuum relief takes place in the massaging phase as it is also the case with natural calf sucking. This vacuum relief has a verifiably positive influence on the teat condition.

Such milking system is disclosed, for example, in EP 1 119 235 B1. In these milking systems teat cup liners are used which in a manner known per se have a teat cup liner head including a connected tube part for receiving the teat. A vacuum connection formed by an inclined end opens into an interior space encompassed by the tube part, with the milking vacuum contacting the vacuum connection. The vacuum connection is in the form of an inclined end of the teat cup liner. In a portion of the tube part adjacent to the inclined end a thin-walled area is formed. The teat cup liner is clamped in a milking cup, wherein vacuum, atmosphere or excess pressure can alternately be applied via a pulsator control to an annular chamber delimited by the tube part. In this way the massaging phase can be controlled by controlling the pressure difference between the interior of the tube part and the external annular chamber, wherein the thin-walled area then folds in and blocks the inclined end toward the vacuum. As regards further details of this milking system, the afore-mentioned patent specification is referred to.

The milk transportation to a milking claw connected to the milking cups/teat cup liners can be further improved when in the teat cup liner a ventilation duct according to DE 10 2006 026 271 A1 and the pertinent additional applications DE 10 2007 053 230 A1 and DE 10 2006 040 079 A1 is formed. In the teat cup liner head a head nozzle may be provided via which the airflow through the ventilation duct is controlled so that permanent vacuum in the head space of the teat cup liner can be prevented.

Despite the extremely positive experiences with the milking system, it is continued to be claimed to design an even gentler milking process.

SUMMARY OF THE INVENTION

Accordingly, the invention is based on the object of providing a teat cup liner which allows for even gentler milking while exhibiting a simple design.

This object is achieved by a teat cup liner including the features of the claims.

Advantageous further developments of the invention are the subject matter of the subclaims.

The teat cup liner according to the invention includes a teat cup liner head and a tube part delimiting an interior space into which a vacuum connection opens. The vacuum connection can be designed as an inclined end, for example, which can be blocked by means of a thin-walled area of the tube part. The tube part according to the invention includes a comparatively thick-walled rear wall of the tube part extending approximately away from the teat cup liner into the area of the vacuum connection, viewed in the axial direction, and encompasses more than 30% of the tube part periphery. The wall thickness of the rear wall of the tube part is definitely larger than the wall thickness of the residual tube part periphery in the teat receiving chamber. This area will hereinafter be referred to as massage wall.

By the approximately half-sided reinforcement of the rear wall of the tube part the main massage of the teat is carried out, similarly to a calf's mouth, by the opposite half side of the tube part only. The teat tip substantially leans only onto the comparatively stiff rear wall of the tube part.

The massaging effect can be improved, when the massage wall, i.e. the wall area(s) forming the periphery with the rear wall of the tube part is/are provided with at least one, preferably two or more stabilizing strips.

The stabilizing strip is preferably formed integrally with the teat cup liner.

In accordance with the invention, two stabilizing strips are arranged spaced apart from each other. The two stabilizing strips may be diagonally inclined relative to each other corresponding to the extension of the rear wall edges tilted viewed in the axial direction.

The inclination may be selected, for example, so that the stabilizing strips extend at a constant parallel distance from the respective rear wall edge.

At least one transverse rib may be provided between the stabilizing strips. The transverse ribs preferably delimit thin-walled massage zones.

This measure guarantees that an optimum massaging effect—irrespective of the teat length—is also ensured in the papillary duct area by the thin wall thicknesses of the massage zones between the at least two strips. The transverse ribs enable also different teat lengths to be massaged at the best.

For example, seven massage zones are formed by six transverse ribs.

As a matter of course, the number of transverse ribs may be varied so that more or fewer massage zones are formed.

The stabilizing strips preferably extend substantially in the longitudinal direction.

For an especially efficient and gentle massaging effect it is provided in an embodiment of the invention that the distance of the stabilizing strips amounts to approximately half of the respective tube part diameter. It is preferred in this context when the distance of the stabilizing strips from each other is larger than the distance of the respective stabilizing strip from the rear wall of the tube part or from the rear wall edge.

So as not to obstruct the inclined end by folding the teat cup liner the stabilizing strips preferably end at a distance from the vacuum connection.

This distance may be from 5 to 15 mm, for example, so that it is ensured that the function of the vacuum connection is not obstructed.

In an embodiment the transverse ribs described in the beginning are arranged at constant distances of e.g. from 8 to 15 mm between the stabilizing strips. The "link chain type" arrangement of the transverse ribs with respect to the stabilizing strips promotes a controlled longitudinal deformation of the massage wall during massage.

The cross-section of the transverse ribs and/or the stabilizing strips preferably takes an approximately semi-circular or trapezoidal shape. The transverse and stabilizing ribs support the resetting of the opening movement of the teat cup liner after massage.

In an embodiment of the invention the wall thickness of the massage wall is larger on the head side than toward the vacuum connection—i.e. the wall thickness of the massage wall decreases away from the teat cup liner head toward the vacuum connection area of the tube part.

In a preferred embodiment of the invention the rear wall of the tube part is transformed approximately stepped into the thinner massage wall.

The transition may be formed by rear wall edges.

In accordance with the invention, it is preferred when the transition is diagonally inclined relative to the longitudinal axis so that the peripheral portion of the rear wall of the tube part decreases from the teat cup liner area toward the vacuum connection and, accordingly, the peripheral portion of the more thin-walled massage wall is increased.

It is especially preferred when the rear wall of the tube part in the area of the teat cup liner head extends approximately along half of that periphery and then decreases toward the vacuum connection so that the peripheral portion of the thinner massage wall is appropriately increased.

In a variant of the invention the tube part has an oval cross-section.

The wall thickness of the massage wall in one embodiment may range from 1 to 3 mm, while the wall thickness of the rear wall of the tube part may range approximately from 3.5 to 5 mm.

In the case of the afore-described conical extension of the wall thickness the wall thickness of the massage wall may amount on the head side to approximately 3 mm and on the vacuum connection side to approximately 1.5 mm. As a matter of course, deviations from the dimensions are possible.

The oval shape of the tube part is given by a difference in diameter of from 0.5 to 2 mm.

The advantages of the conception according to the invention vis-à-vis conventional solutions are as follows:

Due to the reinforced rear wall of the tube part the massage is carried out, as in the case of calf sucking, gently only from one side, and the teat is not squeezed from both sides.

An oval teat cup liner shaft may predetermine a correct collapsing or folding direction of the tube part onto the inclined end.

By the stabilizing strips the massaging motion is controlled, wherein the same distance of the stabilizing strips from the respective rear wall edge results in the same lateral possibility of deformation of the tube part during massage, irrespective of the teat length. The massaging force is transmitted into the upper zones of the teat via the stabilizing strips. The larger distance between the stabilizing strips (compared to the distance from the rear wall edge) optimizes the deformation for optimum massage. Accordingly, the strength and the height of the stabilizing strips control and determine the intensity of the massage and can be optimized depending on the animal breed.

Moreover, by varying the cross-sections of the stabilizing strips the degree of the change of volume between sucking and massaging and thus also the vacuum conditions and the time adjustment of the massaging motion during milking can be adjusted.

The position of the stabilizing strips is preferably selected so that always the correct collapsing direction of the tube part onto the inclined end is assisted, even if certain deforming influences act on the teat cup liner due to the storage of the teat cup liner. As afore-mentioned, it is of advantage when the distance of the stabilizing strips from each other is larger than the lateral distance of the stabilizing strips from the rear wall edge. Due to this dimensionally stable configuration of the teat cup liner a specific individual storage and positioning is no longer required.

The structure formed by two adjacent stabilizing strips and, where necessary, by transverse ribs extending there between in the broadest sense has a symmetric shape. That is to say, in a side view (for example according to FIG. 2 described hereinafter) or, in other words, with a vertical projection of this structure, a central axis practically forming an axis of symmetry in the projection is located in a vertical plane intersecting the central axis of the teat cup liner.

These and other features and advantages of the invention will become apparent to those skilled in the art from the following description and the accompanying drawing. It should be understood, however, that the detailed description and specific examples, while indicating a preferred embodiment of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

A preferred embodiment of the invention shall be illustrated in detail in the following by way of schematic drawings, in which.

DETAILED DESCRIPTION OF THE DRAWINGS

Figure 1:
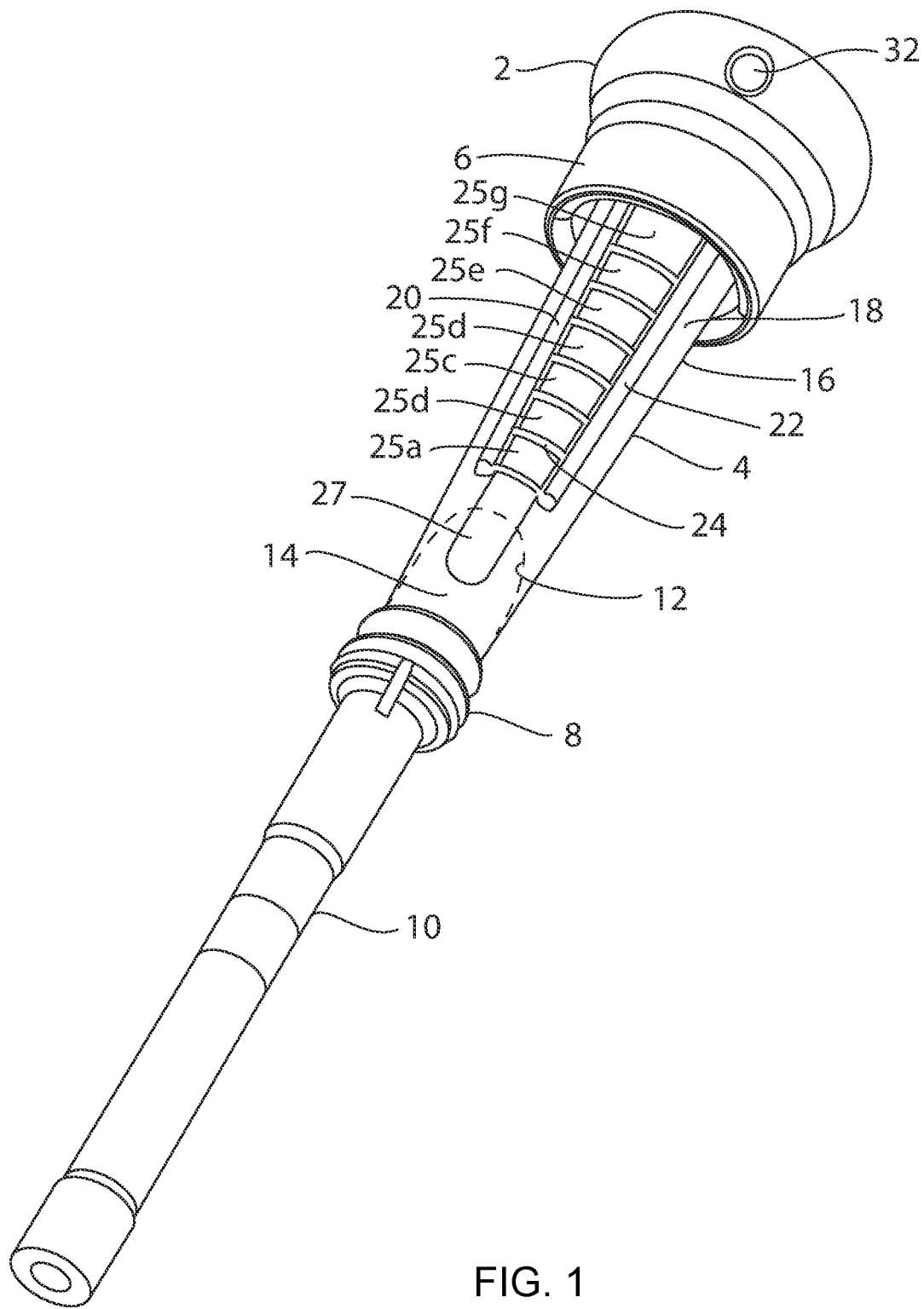
FIG. 1 shows a three-dimensional representation of a teat cup liner according to the invention.

FIG. 1 illustrates a representation of a teat cup liner 1 of a milking cluster which is clamped in a milking cup not shown. An example of the basic structure of a known milking cluster can be seen in the state of the art described in the Background Section. In such so-called twin-chamber milking cup the milking vacuum is applied to the teat in the sucking stroke so that milk can flow from the teat through the teat cup liner 1 and a milk tube to a milking claw. In the massage stroke the teat cup liner 1 is folded (collapses) by the introduction of atmosphere or excess pressure into the afore-mentioned annular chamber between the outer periphery of the teat cup liner 1 and an inner peripheral wall of the milking cup so that the blood is massaged from the teat tip back to the teat base.

The teat cup liner 1 shown in FIG. 1 includes a teat cup liner head 2 which is transformed into a tube part 4. At the teat cup liner head 2 a head sleeve 6 is formed which in portions overlaps with the end portion of the tube part 4 on the side of the teat cup liner head and forms an annular chamber into which an end portion of a milking cup not shown here immerses. The other end portion of the milking cup acts on a clamping bead 8 of the tube part 4 so that the teat cup liner 1 is clamped in the milking cup. The latter comprises a connection via which the annular chamber can be connected between the tube part 4 and the milking cup via a pulsator control to vacuum, atmosphere or excess pressure. In the shown embodiment, an integrated milk tube 10 being attached to a milking claw is connected to the clamping bead 8.

The tube part 4 is tapered with the diameter decreasing away from the teat cup liner head 2 toward the clamping bead 8.

The tube part 4 encompasses a teat receiving chamber into which the teat of the animal to be milked is introduced through the teat cup liner head 2. The teat extends merely along part of the axial length of the tube part 4, however, so that an interior space of the tube part 4 which is not filled by the teat is retained below the teat receiving chamber. In this area an inclined end 12 shown in broken lines in FIG. 1 is formed which is adapted to be closed during the massage stroke by means of a tube part portion, hereinafter referred to as thin-walled area 14, so that the interior space is blocked against the vacuum. The wall thickness of the thin-walled area 14 is designed with respect to optimum folding/collapsing. Details in this respect are explained in the state of the art.

The shown teat cup liner 1 moreover is formed to comprise the ventilation duct described in the beginning and the head nozzle not shown here so as to avoid excessive vacuum in the teat cup head area.

In accordance with the invention, the area of the tube part 4 encompassing the teat is configured to have different wall thicknesses. At the rear in FIG. 1 a tube part rear wall having a comparatively large wall thickness—hereinafter referred to as rear wall 16—is provided forming together with a massage wall 18 designed with a comparatively small wall thickness the tube part 4. In other words, the peripheral area of the tube part 4 is formed by the rear wall 16 and the thin-walled massage wall 18.

For controlling the massaging motion, the massage wall 18 is designed to have two stabilizing strips 20, 22 which, in the view according to FIG. 1, are inclined approximately V-shaped relative to each other and end at a distance above the inclined end 12. The distance may be, for example, 5 to 15 mm. The transverse distance of the two stabilizing strips 20, 22 is decreased toward the inclined end 12. As is visible in FIG. 1, the massage wall 18 and the pertinent stabilizing strips 20, 22 extend into the overlapping area with the head sleeve 6, viewed in the axial direction.

The two stabilizing strips 20, 22 arranged in V-shape relative to each other are connected via a plurality of transverse ribs 24, the distance between the transverse ribs 24 being substantially equal. Due to the V-shaped inclination the transverse ribs 24 are extended toward the teat cup liner head. As explained, this ladder-type or link chain-type arrangement of the stabilizing contour (stabilizing strips 20, 22 and transverse ribs 24) ensures a defined longitudinal and transverse deformation of the massage wall 18.

In the concrete embodiment, seven transverse ribs 24 are configured which, jointly with the laterally arranged stabilizing strips 20, 22, delimit seven massage zones 25a, 25b, 25c, 25d, 25e, 25f and 25g. The length of the transverse ribs 24 is increased due to the V-shaped inclination of the stabilizing strips 20, 22 away from the thin-walled area 14 toward the teat cup liner head 2. In the shown embodiment, along an extension of the two stabilizing strips 20, 22 a central comparatively flat longitudinal elevation 27 is provided which in the shown embodiment is provided with the brand name 'Aktivpuls'.

As illustrated in the beginning, via the stabilizing strips 20, 22 and the transverse ribs 24 the massaging force generated by the collapse of the thin-walled area 14 can be transmitted to the upper teat areas so that appropriate massage is ensured in the papillary duct area. Such good massage is assisted by the comparatively thin massage zones 25 that are delimited by the stabilizing strips 20, 22 and the transverse ribs 24.

As a matter of course, also a different relative arrangement of the stabilizing strips 20, 22 can be chosen. Thus the stabilizing strips could extend in parallel, for example, wherein the strip profile then can be varied over the length, for example, for adaptation to the teat cup liner profile.

Figure 3:
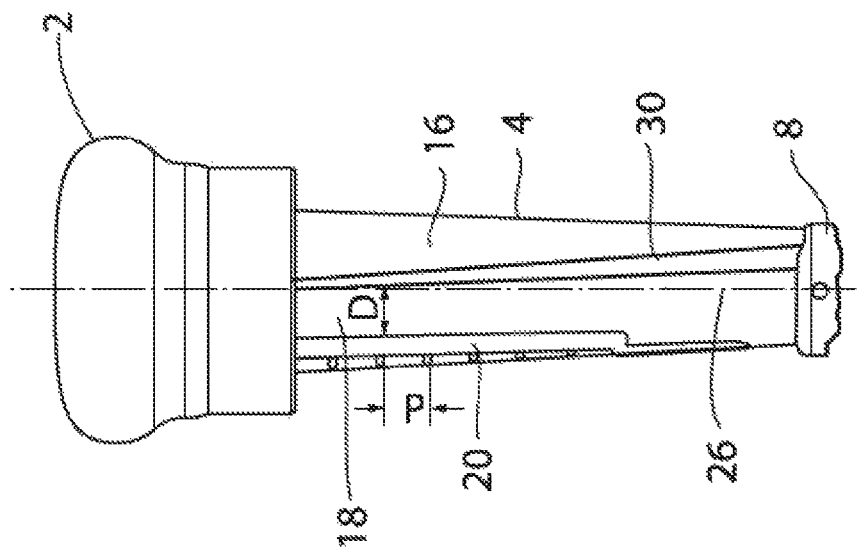
FIG. 3 shows a side view of the teat cup liner.
Figure 2:
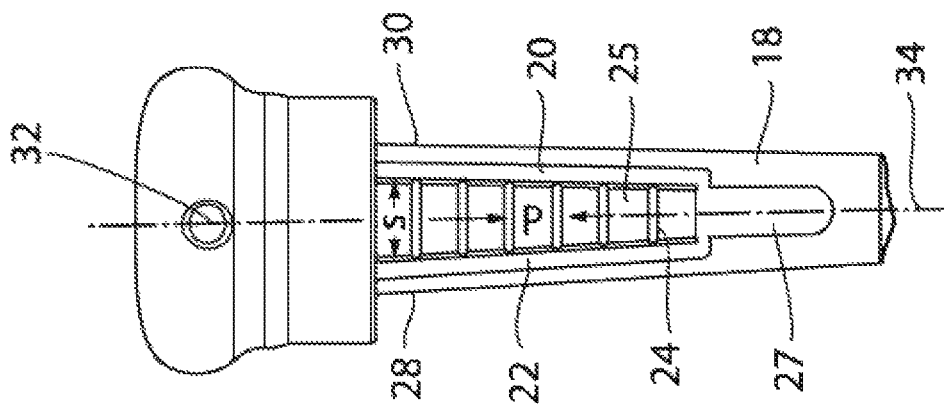
FIG. 2 shows a top view of the teat cup liner from FIG. 1.

As is evident from the front view according to FIG. 2 and the side view according to FIG. 3, the rear wall 16 encompasses in the area of the teat cup liner head 2 approx. 180° of the periphery of the tube part 4. In the area of the clamping bead 8 this peripheral portion is somewhat reduced so that the distance from the vertical plane 26 inserted in FIG. 3 increases toward the clamping bead 8. The transition to the thin-walled massage wall 18 is carried out via two rear wall edges 28, 30. Especially from the representation according to FIG. 3 it is evident that the wall thickness of the massage wall 18 decreases from the teat cup liner head 2 toward the clamping bead 8. The wall thickness of the rear wall 16 remains substantially constant so that, according to the representation in FIGS. 3 and 4, a conical rear wall edge 28, 30 is formed.

The V-position of the two stabilizing strips 20, 22 is selected so that its distance D (cf. FIG. 3) from the adjacent rear wall edge 28 and 30, respectively, remains constant— hence the stabilizing strips 20, 22 extend approximately in parallel to the respective adjacent rear wall edge 28, 30.

In the illustrated embodiment, the distance d of the transverse ribs 24 is within the range of from 8 to 15 mm. The varying distance S between the two stabilizing strips 20, 22 (cf. FIG. 3) should be, in dependence on the dimensions of the tube part 4, about half of the outer diameter of the tube part, i.e. usually about 10 to 14 mm. Moreover, the distance S of the stabilizing strips 20, 22 from each other should be larger than the distance D of the stabilizing strip 18, 20 from each of the adjacent rear wall edges 28, 30.

Figure 4:
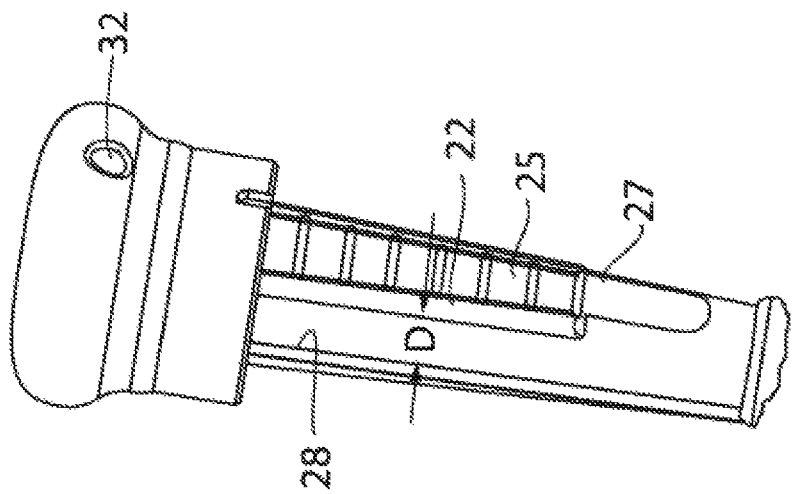
FIG. 4 shows a diagonal view of the teat cup liner from FIG. 1.

In the representation according to FIG. 4 the substantially parallel extension of the rear wall edge 28 and of the adjacent stabilizing strip 22 is especially clearly visible.

The stabilizing structure including the two stabilizing strips 20, 22 and the transverse ribs 24 (in the present case seven transverse ribs 24) may be formed integrally on the teat cup liner head. Basically this reinforcing structure may also be glued on or applied in any other way, however.

As is evident especially from the representation in FIG. 1, the two stabilizing strips 20, 22 may be designed to have approximately a semi-circular profile. According to the representation of FIG. 1, also a hollow profile can be used for controlling the elasticity. The transverse ribs 24 take an approximately trapezoidal shape in the shown embodiment; of course also in this case semi-circular profiles or the like can be used.

The length and the geometry of the stabilizing structure may be varied depending on the animal breed so as to optimize the massage.

In the view according to FIG. 2, the structure made of the stabilizing strips 20, 22 and the transverse ribs 24 is practically shown in a vertical projection onto the plane of projection. If the centers of the transverse ribs 24 are interconnected, a structural axis 34 extending in parallel to the teat cup liner axis in the view according to FIG. 2 is obtained. That is to say, the structural axis and the central axis are located in a joint vertical plane in which also the central axis of the structure in a three-dimensional representation is appropriately located. In this vertical plane also the central axis of the diametrically opposed rear wall 16 is located. In other words, the structure consisting of the two stabilizing strips 20, 22 and the transverse ribs 24 connecting the same is also formed symmetrically with respect to the opposite rear wall.

The FIGS. 1 to 4 furthermore show a signal element 32 formed on the teat cup liner head wall by which the head vacuum can be controlled. Details of this element are illustrated in an application deposited in parallel.

The invention relates to a teat cup liner comprising a comparatively thick-walled rear wall and a comparatively thin-walled massage wall, the walls together forming a tube part. In accordance with the invention, at least two stabilizing strips are provided on the massage wall.

Although the best mode contemplated by the inventors of carrying out the present invention is disclosed above, practice of the above invention is not limited thereto. It will be manifest that various additions, modifications and rearrangements of the features of the present invention may be made without deviating from the spirit and the scope of the underlying inventive concept.

The invention claimed is:

1. A teat cup liner comprising:
   a teat cup liner head, and
   a tube part that defines first and second ends with the teat cup liner head at the first end of the tube part and a vacuum connection at the second end of the tube part, the tube part delimiting an interior space and including a tube part rear wall and a massage wall,
   the tube part rear wall extending from the teat cup liner head at the first end of the tube part toward the vacuum connection at the second end of the tube part over more than 30% of a peripheral area of the tube part, the wall thickness of the tube part rear wall being greater than the wall thickness of the massage wall,
   the massage wall together with the rear wall forming the tube part in a teat-receiving area, wherein the massage wall includes:
      at least two stabilizing strips including two stabilizing strips arranged within the massage wall and extending longitudinally from the first end of the tube part toward the second end of the tube part, the two stabilizing strips transversely spaced from each other and arranged in one of: (i) a parallel relationship relative to each other, and (ii) a V-shape relative to each other,
      transverse ribs spaced from the tube part rear wall and bounded by and extending transversely between the stabilizing strips in continuous directions that are substantially parallel to each other, and
   wherein the rear wall extends on the end of the teat cup liner head along half of the periphery of the tube part and on the end of the vacuum connection along a smaller peripheral portion.

2. The teat cup liner according to claim 1, wherein the stabilizing strips are diagonally inclined relative to each other.

3. The teat cup liner according to claim 1, wherein each of the two stabilizing strips extends parallel to a longitudinal axis of the tube part when viewed from a side elevation.

4. The teat cup liner according to claim 1, wherein a massage zone is defined between the stabilizing strips and each of the respective pairs of the transverse ribs.

5. The teat cup liner according to claim 1, wherein a distance between the two stabilizing strips is at least one of: (i) approximately half of the tube part diameter, and (ii) greater than a distance between one of the stabilizing strips from the rear wall.

6. The teat cup liner according claim 1, wherein the stabilizing strips end at a position on the tube part that is spaced from the vacuum connection.

7. The teat cup liner according to claim 1, wherein the wall thickness of the massage wall is smaller on the connection end than on the head end.

8. The teat cup liner according to claim 1, wherein a step-change in thickness is defined at a transition between the rear wall and the massage wall.

9. The teat cup liner according to claim 8, wherein the step-change in thickness defined at the transition between the rear wall and the massage wall is provided by each of rear wall edges that define sides of the rear wall.

10. The teat cup liner according to claim 1, wherein a transition zone is defined between the rear wall and the massage wall and is diagonally inclined with respect to a longitudinal axis.

11. The teat cup liner according to claim 1, wherein the cross-section of the tube part is oval.

12. The teat cup liner according to claim 1, wherein the wall thickness of the rear wall is within the range of from 3.5 to 5 mm and the wall thickness of the massage wall is within the range of from 1.0 to 3.0 mm.

13. The teat cup liner according to claim 1, comprising a longitudinal elevation formed along an extension of the stabilizing strips.

14. The teat cup liner according to claim 1, wherein a central axis of a vertical projection of the two stabilizing strips is located in a vertical plane of the teat cup liner.

* * * * *